Patented Aug. 12, 1941

2,252,280

UNITED STATES PATENT OFFICE 2,252,280

DECOMPOSITION OF WATER-INSOLUBLE PHOSPHATES

Otto Balz, Ludwigshafen-on-the-Rhine, Heinrich Hamacher, Frankenthal, and Wilhelm Wagner, Ludwigshafen-on-the-Rhine, Germany, assignors, by mesne assignments, to Walter H. Duisberg, New York, N. Y.

No Drawing. Application June 11, 1938, Serial No. 213,186. In Germany June 26, 1937

1 Claim. (Cl. 23—102)

The present invention relates to improvements in the decomposition of water-insoluble phosphates.

For the purpose of obtaining solid calcium nitrate and solutions containing phosphoric acid by decomposing phosphates, especially rock phosphate, with acids, it has already been proposed to dissolve the phosphate at elevated temperatures, for example above 65° C., in nitric acid and to allow the calcium nitrate to crystallize out from the hot liquid in the form of hydrate by cooling.

We have now found that it is possible to carry out the decomposition sufficiently rapidly even at or below room temperature and that working at low temperatures is attended by considerable advantage. According to our invention such low temperatures and such concentrations are used that the separation of the calcium nitrate takes place during the reaction or immediately thereafter. The process may be carried out for example by precooling nitric acid of medium strength, advantageously a nitric acid of from 55 to 65 per cent (by weight), and then bringing the acid together with the amount of phosphate to be worked up, care being taken that a sufficiently low temperature is maintained in the reaction material so that the calcium nitrate can crystallize out directly. Generally speaking a temperature of from about 10° to 15° C. is sufficient; temperatures above 25° C. are to be avoided. When the introduction of the crude phosphate into the nitric acid is completed, the separation of the calcium nitrate is usually also completed. Retardations of the crystallization, which are encountered in the precipitation of calcium nitrate from hot decomposition solutions, do not occur in the present case.

The process yields well crystallized calcium nitrate which can be separated from the mother liquor without difficulties. This is attributable to the fact that after the decomposition carried out in the cold the impurities of the crude phosphate are present in a convenient form which does not hinder the filtration of the precipitate, whereas in the known decomposition in the hot state the separation of the calcium nitrate offers considerable difficulty by reason of the accompanying impurities of organic and inorganic nature. A further advantage of our process consists in the fact that the fluorine compounds contained in the crude phosphate are only slightly attacked or not attacked at all by reason of the low decomposition temperature. This has the result that after the separation of the crystallized calcium nitrate, there are obtained in the further working up of the mother liquor containing phosphoric acid into phosphates or mixed phosphate fertilizers, in particular by neutralization with ammonia, products which have an excellent citrate-solubility.

The separated calcium nitrate, when using from about 55 to 57 per cent nitric acid as the decomposition acid, constitutes mainly a mixture of calcium nitrate tetrahydrate and a hitherto unknown acid salt of the formula: $3Ca(NO_3)_2.12H_2O.HNO_3$. When using acids of higher concentration, as for example a 60 per cent acid, the ratio of the two salts is displaced to a great extent in favor of the acid salt.

The nitric acid is preferably used in such an excess that after separation of the calcium nitrate there remains a mother liquor which yields in its further working up to fertilizer salts the desired ratio of nitrogen to phosphoric acid. Thus for example when using an about 20 per cent excess of a 60 per cent nitric acid above the theoretical amount, there is obtained, after removal of the calcium nitrate precipitated at about 12° C., a filtrate which by neutralization with ammonia without the addition of further fertilizer salts yields a mixed fertilizer having the ratio of $N:P_2O_5$=about 1:1.

Any water-insoluble phosphates, in particular mineral phosphates, such as pebble phosphate or Morocco phosphate, or any other kind of phosphate or mixtures of the same in a ground or chipped form may be decomposed with equally goods results according to this invention.

The following examples will further illustrate the nature of this invention but the invention is not restricted to these examples. The parts are by weight.

Example 1

100 parts of calcined coarsely ground Morocco phosphate are introduced while stirring into 235 parts of 59 per cent nitric acid cooled to 12° C., the introduction being effected during the course of 30 minutes. A temperature of about 12° C. is maintained in the reaction mass by cooling. The crude phosphate reacts with the nitric acid during the introduction with the formation of calcium nitrate and phosphoric acid and calcium nitrate separates in a well crystallized form. After the introduction of the crude phosphate, the separation of the calcium nitrate is also completed. By separating the crystals from the mother liquor there are obtained 190 parts of moist calcium nitrate consisting to the extent of about 30 per cent of the salt $$3Ca(NO_3)_2.12H_2O.HNO_3$$

If the same amounts of crude phosphate and nitric acid be worked up without cooling, a temperature of 70° C. or more is set up in the reaction mass. If the reaction mass be cooled after completion of the reaction to 12° C. within an hour, calcium nitrate does not commence to crystallize from the viscous solution until after about 4 hours.

*Example 2*

50 parts of calcined Morocco phosphate having a grain size of up to about 1 millimeter are introduced during the course of 40 minutes into 140 parts of 63 per cent nitric acid cooled to 17° C. while stirring and maintaining the said temperature. By filtration there are obtained 60 parts of moist calcium nitrate consisting practically completely of the salt $$3Ca(NO_3)_2.12H_2O.HNO_3$$

If the reaction of the same amounts of initial materials be carried out at 70° C., there is obtained after cooling the reaction liquid to 17° C. a viscous solution from which calcium nitrate crystals do not commence to separate until after from about 3 to 5 hours.

What we claim is:

In the process of decomposing water-insoluble phosphates with nitric acid in an amount at least sufficient to convert all the phosphates into calcium nitrate and phosphoric acid, the improvement which comprises maintaining a temperature not exceeding 25° C. during the decomposition and effecting the decomposition with nitric acid of from 55 to 65 per cent, the temperatures and concentrations being so correlated as to obtain substantial crystallization of the calcium nitrate not later than the completion of the decomposition and at the reaction temperature and separating the crystallized calcium nitrate from the phosphoric acid-containing reaction liquid.

OTTO BALZ.
HEINRICH HAMACHER.
WILHELM WAGNER.